Oct. 8, 1963 R. A. KIRK 3,106,126
CONTROL SYSTEM FOR A MOTION PICTURE CAMERA
Filed Sept. 12, 1960 2 Sheets-Sheet 1
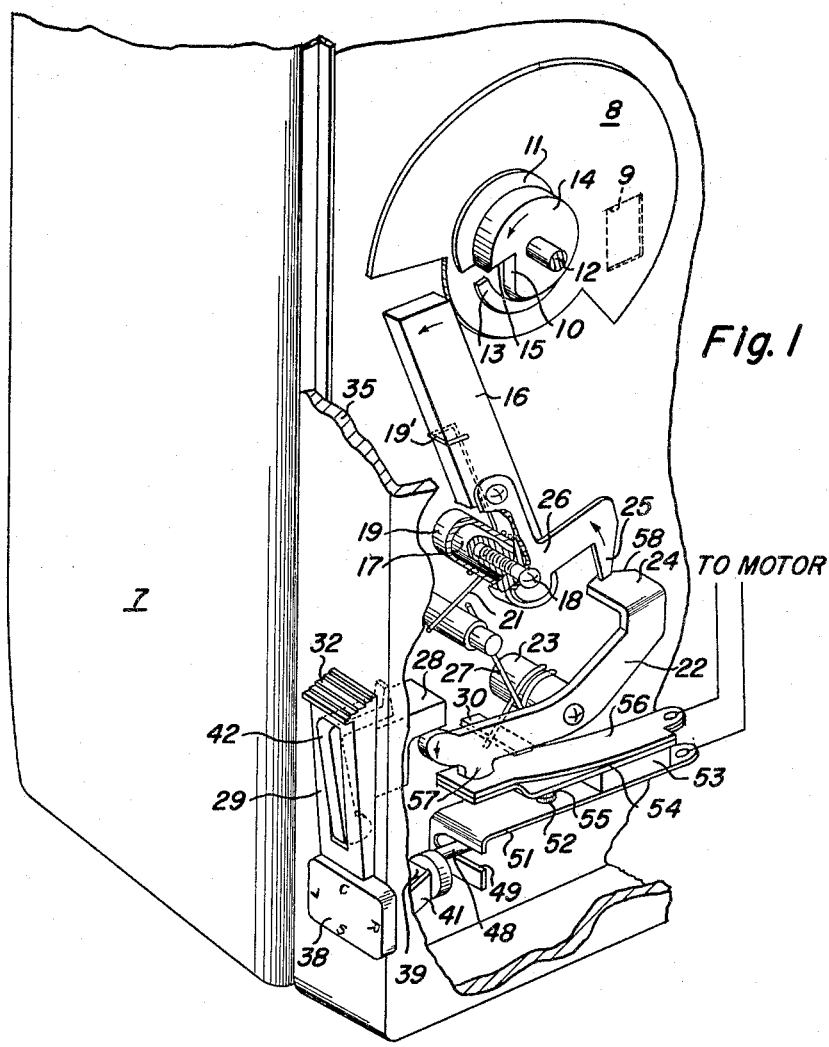
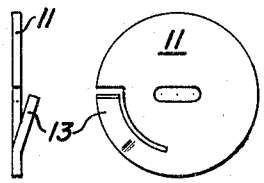
Fig.3 Fig.2
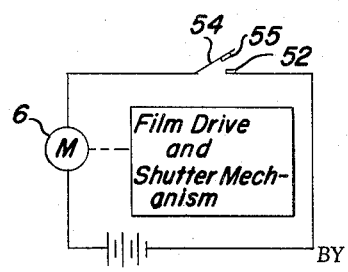
Fig. 7
ROBERT A. KIRK
INVENTOR.
BY
ATTORNEYS Oct. 8, 1963   R. A. KIRK   3,106,126
CONTROL SYSTEM FOR A MOTION PICTURE CAMERA
Filed Sept. 12. 1960   2 Sheets-Sheet 2

ROBERT A. KIRK
INVENTOR.

BY R. Frank Smith
Steve W. Grembow
ATTORNEYS 3,106,126
CONTROL SYSTEM FOR A MOTION PICTURE CAMERA
Robert A. Kirk, Rochester, N.Y., assignor to Eastman Kodak Company, Rochester, N.Y., a corporation of New Jersey
Filed Sept. 12, 1960, Ser. No. 55,541
8 Claims. (Cl. 88—16)

This invention relates generally to cameras, and more specifically to an improved control system for a motion-picture camera.

Although control systems for cameras of one type or another are well known in the art, this invention involves a control system for selectively placing the camera in the following operating positions:

(1) A normal camera operation position in which camera operation is solely dependent upon the depression of a camera operating button; the camera operating as long as the button is depressed.

(2) A continuous camera operating position in which the operator initially momentarily depresses the camera operating button to initiate camera operation, and the button is releasably held in the operating position until released by the operator.

(3) A single-frame exposure position in which depression of the camera operating button results in only a single frame of the film being exposed; a single frame being exposed each time the button is depressed.

(4) A lock position in which depression of the camera operating button is prevented.

One of the primary objects of the present invention is to provide an improved control system for a camera which is selectively movable into different positions for achieving different camera operations.

Another object of this invention is to provide an improved control system for a motion-picture camera that is of simple design and construction, thoroughly reliable and efficient in operation, and economical to manufacture.

A further object of this invention is to provide an improved control system for a motion-picture camera in which a plurality of different camera operations is secured with a minimum of moving parts.

A more specific object of this invention is the provision of an improved control system for a motion-picture camera in which a plurality of camera operations is dependent upon and controlled by the amount of travel the camera operating button is capable of.

A more specific object of this invention is to provide an improved control system for a motion-picture camera in which the amount of travel the camera operating button is capable of is controlled by a cam.

Objects and advantages other than those set forth above will be apparent from the following description when read in connection with the accompanying drawings, in which:

FIG. 1 is a fragmentary view in perspective of a camera embodying a preferred form of the control system of this invention and showing the control system in the continuous operating position;

FIG. 2 is a front elevation view of a hold-out spring of the control system;

FIG. 3 is a side elevation view of the spring of FIG. 2;

FIG. 7 is a schematic wiring diagram for the camera incorporating the present invention.

Figure 4:
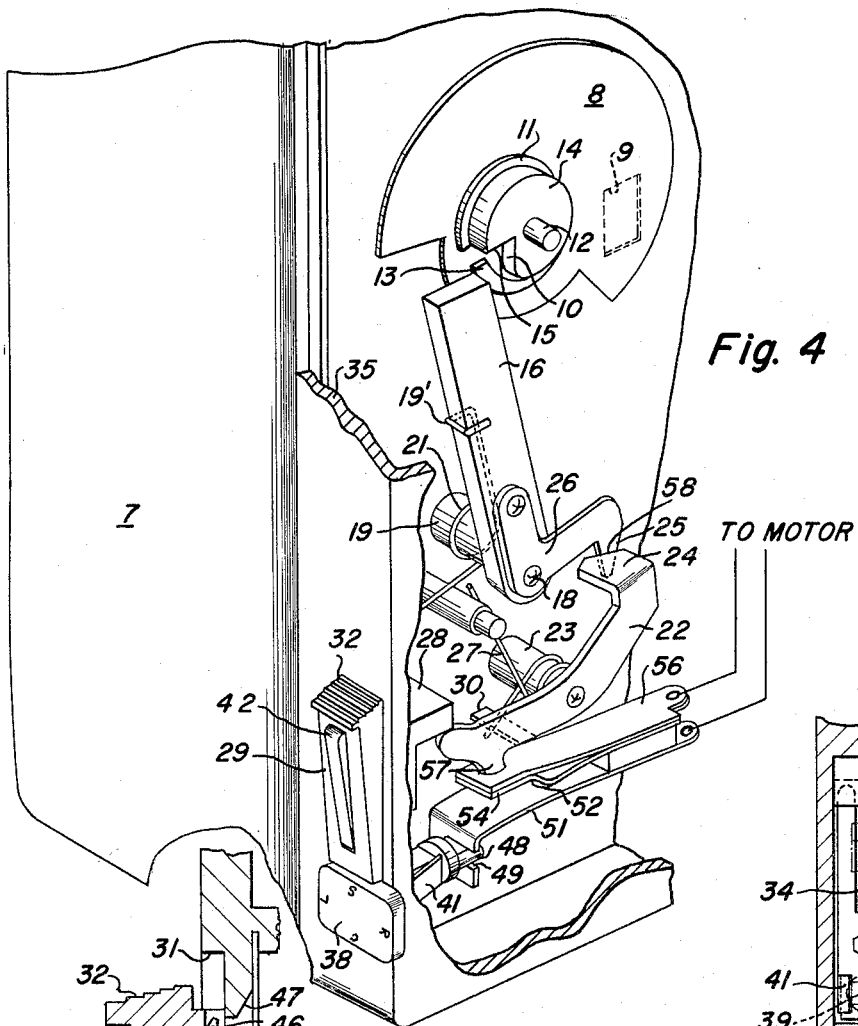
FIG. 4 is a view similar to FIG. 1 showing the control system in a single frame operating position.

As shown in the drawings, this invention is embodied in a motion-picture camera 7 of the conventional type having a shutter blade 8 adapted when rotated by a camera drive motor 6 to intermittently uncover an aperture 9 through which light may pass for exposing the film. This specific invention is shown in connection with an electric motor driven motion-picture camera, but it should be understood that the control system disclosed and described herein could be readily adapted to a camera utilizing any conventional type of drive motor, whether electrical or mechanical.

The control system comprises a thin circular spring disc 11 mounted adjacent shutter blade 8 on a shutter shaft 12 and rotatable therewith. Shaft 12 is connected to a film drive mechanism shown schematically in FIG. 7, and both are driven by motor 6 through a suitable slip clutch in a conventional way. The disc 11 has a struck-out arcuate spring finger 13 as best seen in FIGS. 2 and 3 which is axially flexible and hence readily movable so that it is substantially parallel to the plane of disc 11, but is rigid and resists any radial movement towards the center of disc 11. A cam 14 having a notch 10 terminating in a shoulder 15 is also mounted on shutter shaft 12 adjacent disc 11 with finger 13 extending into notch 10, and shutter blade 8, disc 11 and cam 14 are rotatable as a unit upon rotation of shutter shaft 12. A lever 16 has one end secured to a pin 17 by a screw 18, and pin 17 serves as a pivot within a fixed sleeve 19. A wire spring 21 has a portion thereof wrapped around sleeve 19 and one end 19' bearing against lever 16 for urging it in a clockwise direction towards the periphery of cam 14 with which it is aligned. A bell crank 22 secured to a pin, not shown, pivotal within a sleeve 23, has a bent-over flange 24 at one end adapted to engage a toe 25 formed by a flexible arm 26 secured to lever 16. The bell crank 22 is urged in a clockwise direction by a spring 27 having a portion thereof wrapped around sleeve 23, and one end engaging ear 30 causing the opposite end of bell crank 22 to engage a lug 28 formed by a reciprocally movable camera operating button 29, and move button 28 upwardly against a stop 31 seen in FIG. 5 into its normally inoperative position. The button 29 has a stepped finger-engaging end 32 and a body portion 33 extending through a slotted opening 34 in camera frame 35. The button 28 is retained against frame 35 by a slotted retainer 36 seen best in FIGS. 5 and 6.

Figure 5:
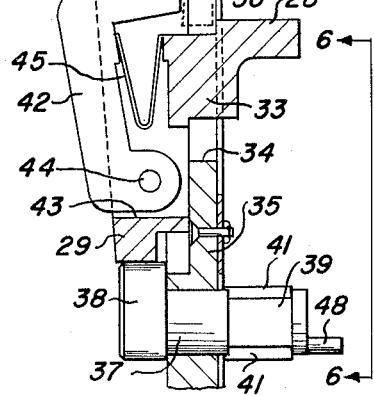
FIG. 5 is an enlarged detail view, in section, of the camera operating button and control cam.
Figure 6:
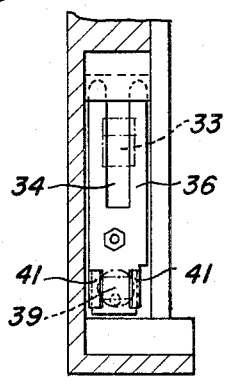
FIG. 6 is an elevation view of the structure FIG. 5 taken in the direction indicated by line 6—6 of FIG. 5.

A rotatable stop member 37 is provided in camera frame 35 and has a rectangular plate 38 at one end extending into the path of the lower end of button 29. Each side of plate 38 is spaced a different distance from the axis of member 37, and forms a stop for the lower end of button 29 when moved into abutment therewith. Stop member 37 has a portion 39 of square configuration cooperating with spring arms 41 formed by retainer 36 to form a detent for releasably holding member 37 and plate 38 with a selected side thereof in register with the lower end of button 29. Since the sides of plate 38 are all spaced a different distance from its center, this varies the distance that button 29 may be depressed from its normally inoperative position. One side of plate 38 has a letter designation C, and when moved in register with button 29 and engaged thereby upon depression of button 28 establishes the continuous camera operating position. A latch 42 disposed in a center slot 43 of button 29 and pivoted thereto at 44 is urged by a spring 45 interposed between button 29 and latch 42 into an unlatched position as seen in FIG. 5. Camera 7 will continue to run or operate without the necessity of the operator keeping button 29 depressed. Another side of plate 38 is designated R, and when button 29 is depressed to this stop, camera 7 will operate but will immediately stop operating upon release of button 29 by the operator. A third side of plate 38 is designated S and provides the stop for single-frame operation. Each time the operator depresses button 29 to this stop position, camera 7 will operate to expose a single frame and will then automatically stop. The fourth side of plate 38 is designated L and when it is positioned to form a stop for button 29, camera 7 is in the "lock" position. In this position, the stop prevents the operator from depressing button 29 far enough to cause camera 7 to operate.

The opposite end of rotatable stop member 37 has an eccentric pin 48 extending into a slot 49 formed by a turned down end of a leaf spring 51 having a contact 52 mounted thereon, the opposite end of spring 51 being secured to one side of an insulator 53 of any known type. Another leaf spring 54 is provided having a contact 55 complementary to contact 52, and having one end secured to the opposite side of insulator 53. An insulating strip 56 is secured at one end to spring 54 and interposed between spring 54 and a projection 57 of bell crank 22. The two contacts 52, 55 cooperate to form a switch for electric motor 6 shown schematically in FIG. 7, and when closed complete an electrical circuit to motor 6 causing it to operate.

In the operation of this invention, let us assume initially that camera 7 is in a rest position in which shutter blade 8 is locked by shoulder 15 engaging the end of lever 16. The spring 27 in this position urges bell crank 22 in a clockwise direction causing its end to move lug 28 and camera button 29 upwardly into engagement with its stop 31. Now let us assume that the operator moves stop member 37 until the side of plate 38 designated L is in the path of camera button 29. The camera 7 is now in a "lock" position, and the operator cannot depress camera button 29 sufficiently to cause camera 7 to operate.

Let us now assume that the operator moves stop member 37 placing the side of plate 8 designated R in the path of camera button 29. The camera 7 is now in the normal camera operating position, and upon depression of camera button 29, lug 28 pivots bell crank 22 against the bias of its spring 27 causing projection 57 to move spring 54 downwardly closing contacts 52, 55 and completing the circuit to electric motor 6. Although motor 6 is energized, shutter blade 8 is prevented from rotating by shoulder 15 engaging the end of lever 16, but further downward movement of camera button 29 causes flange 24 to engage toe 25 and urge lever 16 in a counterclockwise direction against the bias of its spring 21 withdrawing its end from shoulder 15 and permitting shutter blade 8, disc 11 and cam 14 to rotate. By properly designing and positioning bell crank 22 and springs 51, 54 it is possible if desired to simultaneously close contacts 52, 55 to motor 6 and release cam 14, although it is believed preferable to close the switch a short time interval before cam 14 is released to permit motor 6 to reach its operating speed. The camera 7 will continue to operate as long as the operator keeps camera button 29 depressed. When button 29 is released, spring 27 urges bell crank 22 in a clockwise direction returning button 28 to its original position and releasing contacts 52, 55 which moves into their normally open position, and withdraws flange 24 from toe 25 permitting lever 16 to be urged by its spring 21 into engagement with the periphery of cam 14. The lever 16 will ride on the periphery of cam 14 and into its notch 10 into engagement with shoulder 15 preventing any further rotation of shutter blade 8. As the end of lever 16 rides into notch 10, it depresses spring finger 13 which is axially flexible.

Let us now assume that the operator turns stop member 37 until the side of plate 38 designated C is in the path of camera button 29. In this continuous operating position, the operation of camera 7 is identical to the operation of the camera in the normal operating position. However, in this continuous operating position, the operator can depress camera button 29 further than in the normal operating position so that the end of latch 42 is free to be manually moved inwardly into slot 34, see dotted line position FIG. 5, and then upwardly when downward pressure is released causing projection 46 to engage behind shoulder 47 to releasably hold camera button 29 in its depressed position permitting camera 7 to operate without further attention by the operator. When the operator desires to stop camera 7 from operating, he merely depresses camera button 29 into engagement with the stop withdrawing projection 46 from shoulder 47 to permit latch 42 to be kicked out by its spring 45, and then releases button 29 which is urged into its original position by spring 27.

Now let us assume that the operator wishes to take some single frame exposures. The stop member 37 is then rotated placing the side of plate 38 designated S in the path of camera button 29 as seen in FIG. 4. In this "single-frame" position, camera button 29 may be depressed the greatest distance before it strikes the stop plate 38. As camera button 29 is depressed by the operator, flange 24 of bell crank 22 initially withdraws the end of lever 16 from shoulder 15, and further depression of button 29 causes toe 25 to slip off a beveled edge 58 of flange 24 as seen in FIG. 4. In this position, lever 16 is free and is urged by its spring 21 toward cam 14 and into engagement with spring finger 13 which because of its axial flexibility has moved into the path of lever 16 and because of its radial rigidity prevents lever 16 from entering notch 10. Further depression of camera button 29 closes contacts 52, 55 causing shutter blade 8, disc 11, and cam 14 to rotate through one revolution, at which time lever 16 enters notch 10 and is engaged by shoulder 15 in the normal manner. In the single-frame position, it is necessary to delay the closing of contacts 52, 55 until toe 25 slips over beveled edge 58 of flange 24 permitting lever 16 to be urged into engagement with spring finger 13. This delay is accomplished by eccentric pin 48 which, in the single-frame position, moves spring 51 and contact 52 downwardly away from spring 54 and contact 55. Consequently, contacts 52, 55 are not closed until lever 16 is in engagement with spring finger 13. If this delay were not provided, shutter blade 8 would begin turning as soon as lever 16 is drawn clear of shoulder 15 and would probably complete several revolutions before toe 25 slips off of beveled edge 58 of flange 24 permitting lever 16 to return to cam 14 for stripping same. When camera button 29 is released by the operator, beveled edge 58 cams flexible toe 25 laterally out of the way as bell crank 22 is returned to its original position, see FIG. 1.

The invention has been described in detail with particular reference to a preferred embodiment thereof, but it will be understood that variations and modifications can be effected within the spirit and scope of the invention as described hereinabove and as defined in the appended claims.

I claim:

1. In a motion-picture camera having a shutter blade movable by a drive means from a rest position to make an exposure, the combination comprising:

A. a releasable latch for preventing movement of said shutter and including (1) a disc connected to said shutter to rotate therewith and having a projection, (2) a pivotal member movable between a normal latching position, in which it engages said projection for releasably holding said shutter blade in its rest position, and an unlatching position, in which it is withdrawn from engagement with said projection to release said shutter blade for movement to make an exposure, and (3) resilient means movable between a normal blocking position, in which it blocks movement of said pivotal member to its latching position immediately after said member has been moved to its unlatching position, and an unblocking position to which it is moved by said pivotal member as it returns from its unlatching position to its latching position while said shutter is moved to make an exposure, and B. control means for said latch member selectively movable from an inoperative position corresponding to the positioning of said member in its latching position, to
  (1) a first position for moving said latch member to its unlatching position and positively holding it there as long as said control means is held in said first position, and
  (2) a second position for momentarily moving said pivotal member to its unlatching position for making a single exposure, regardless of the length of time said control means is held in said second position.

2. The invention according to claim 1 wherein said shutter blade and disc are mounted on a shaft, and said resilient means comprises a leaf spring movable with said disc, said leaf spring in its blocking position projecting in front of said projection, said leaf spring further being flexible axially of said disc, and being relatively rigid radially of said disc.

3. The invention according to claim 1 and further including a stop means for said control means for establishing said first and second positions, said control means comprising a reciprocally movable operating button, and said stop means comprising a rotatable cam having surfaces of varying distance from the center adapted to be selectively positioned in the path of said button.

4. The invention according to claim 1 wherein said member has a flexible arm engageable by said control means.

5. The invention according to claim 4 wherein said control means comprises a pivotal bell crank having a flange in engagement with said flexible arm.

6. The invention according to claim 5 wherein said flange has a beveled edge and said flexible arm slips over said edge upon movement of said control means into said second position, said edge camming said arm out of its way as said control means returns to its inoperative position.

7. In a control mechanism for a motion-picture camera having a shutter blade movable by a drive means from a rest position to make an exposure, the combination comprising:
A. a latch including
  (1) a disc movable with said shutter mechanism and having a projection, and
  (2) a pivotal member movable between a normal latching position in which it engages said projection for releasably holding said shutter blade in its rest position, and an unlatching position in which said member is withdrawn from said projection releasing said shutter blade for movement to make an exposure;
B. a manually operated control means for said latch member comprising a reciprocally movable button which is selectively movable from an inoperative position corresponding to a positioning of said member in its latching position to
  (1) a first position for moving said latch member into its unlatching position and positively holding it there as long as said control means is manually held in said first position,
  (2) a second position for moving said member into its unlatching position and positively holding it there even though the manually applied force used to move said control means to said second position is removed, and
  (3) a third position for momentarily moving said latch member to its unlatching position for making a single exposure regardless of the length of time said control means is held in said third position; and
C. stop means for said control means for establishing said first, second, and third positions, said stop means comprising a rotatable cam having surfaces of varying distance from its center adapted to be selectively positioned in the path of said button.

8. In a control mechanism for a motion-picture camera having a shutter blade rotatably driven by an electric motor from a rest position to make an exposure, the combination comprising:
A. a latch including
  (1) a disc movable with said shutter mechanism and having a projection,
  (2) a pivotal member movable between a normal latching position in which it engages said projection for releasably holding said shutter blade in its rest position, and an unlatching position in which it is withdrawn from said projection releasing said shutter blade for movement to make an exposure; and
  (3) resilient means for preventing said member from returning to a position in front of said projection immediately after said shutter blade is released, but allows said projection to engage said member after said disc is rotated through a single revolution;
B. a manually operated control means for said latch member and selectively movable from an inoperative position corresponding to the positioning of said member in its latching position to
  (1) a first position for moving said latch member to its unlatching position and positively holding it there while said shutter blade makes successive exposures as long as said control means is manually held in said first position,
  (2) a second position for moving said latch member into its unlatching position and positively holding it there even though the manually applied force used to move said control means to said second position is removed, and
  (3) a third position for momentarily moving said latch member into its unlatching position for making a single exposure regardless of the length of time said control means is held in said third position, said control means further comprising
    (a) a switch in circuit with said electric motor, said switch having a pair of contacts, one of which is mounted on a flexible support having a slot, said switch further being movable into a closed position for energizing said motor upon movement of said control means into either of said first, second, or third positions, and
C. stop means for said control means for establishing said first, second and third positions, said stop means further comprising an eccentric pin insertable in said slot of said flexible support for changing the position of said one contact upon movement of said stop means for establishing said first, second, and third positions.

References Cited in the file of this patent
UNITED STATES PATENTS

| 2,083,646 | Fuller | June 15, 1937 |
| 2,323,576 | Sperry | July 6, 1943 |
| 2,462,302 | Bolsey | Feb. 22, 1949 |
| 2,711,117 | Favre | June 21, 1955 |

FOREIGN PATENTS

| 182,036 | Austria | May 25, 1955 |